United States Patent [19]

Hosono et al.

[11] Patent Number: 4,636,843

[45] Date of Patent: Jan. 13, 1987

[54] DEFLECTION CONTROL APPARATUS FOR A BEAM INDEX COLOR TELEVISION RECEIVER

[75] Inventors: Takashi Hosono, Kanagawa; Akira Tohyama, Chigasaki, both of Japan

[73] Assignee: Sony Corporation, Tokyo, Japan

[21] Appl. No.: 671,955

[22] Filed: Nov. 16, 1984

[30] Foreign Application Priority Data

Nov. 21, 1983 [JP] Japan .................................. 58-219255

[51] Int. Cl.⁴ ......................... H04N 9/24; H01J 29/74; H01J 29/76; H01J 29/56

[52] U.S. Cl. ........................................ 358/67; 358/69; 315/369; 315/370

[58] Field of Search ....................... 358/64, 66, 67, 69, 358/70; 315/369, 370, 371

[56] References Cited

U.S. PATENT DOCUMENTS

| | | | |
|---|---|---|---|
| 2,927,152 | 3/1960 | Yando | 358/70 |
| 4,251,832 | 2/1981 | Isono | 358/69 |
| 4,287,531 | 9/1981 | Mitamura et al. | 358/67 |
| 4,305,022 | 12/1981 | Mitamura et al. | 358/67 |

FOREIGN PATENT DOCUMENTS

| | | | |
|---|---|---|---|
| 11814 | 1/1977 | Japan | 358/67 |
| 145522 | 12/1978 | Japan | 358/67 |
| 137785 | 10/1980 | Japan | 358/67 |

*Primary Examiner*—James J. Groody
*Assistant Examiner*—Randall S. Svihla
*Attorney, Agent, or Firm*—Lewis H. Eslinger; Alvin Sinderbrand

[57] ABSTRACT

Deflection control apparatus for a beam index color television receiver includes a phase-locked loop for synchronizing an oscillating signal with an index signal generated by an electron beam scanning index stripes on the screen of the cathode ray tube of the receiver. The oscillating signal is supplied to a color switcher so that the scanning electron beam is modulated with color information corresponding to the respective color phosphor stripe being scanned. An error signal representative of the horizontal scanning speed of the beam is supplied to a deflection device to cause the generation of a compensating magnetic field to correct for non-linearities in the scanning speed. A compensation circuit delays the error signal so that the elapsed time from the detection of the scanning of one of the index stripes to the time of generation of the compensating magnetic field in accordance therewith equals one horizontal line period.

4 Claims, 4 Drawing Figures

DEFLECTION CONTROL APPARATUS FOR A BEAM INDEX COLOR TELEVISION RECEIVER

FIELD OF THE INVENTION

This invention relates generally to beam index color television receivers and more specifically relates to a beam index color television receiver having real time compensation for horizontal deflection speed errors.

BACKGROUND OF THE INVENTION

In a typical beam index color television receiver, the cathode ray tube (CRT) has a single electron beam which scans color phosphor stripes provided on the display screen, and the scanning electron beam is modulated with the appropriate color information as the beam scans corresponding color phosphor stripes, in a process known as three color point sequential scanning. This differs from the conventional color CRT in which three individual electron beams simultaneously scan the color phosphor stripes with each beam being modulated with its associated color information.

A typical display screen of a beam index CRT has color phosphor stripes formed as triads of red (R), green (G) and blue (B) stripes, arranged successively in the horizontal scanning direction at a predetermined pitch, or spacing, so that the beam repeatedly scans RGB RGB ... phosphor stripes. When the beam scans the R stripe, red color information is used to modulate the intensity of the beam, and correspondingly green and blue color information modulates the beam when it scans the B and G stripes, respectively.

In addition to the color phosphor stripes, a series of fluorescent or phosphorescent index stripes are provided on the display screen in a predetermined relationship with the triads of color phosphor stripes. As each index stripe is scanned by the beam, it emits light which is detected by a photodetector. The photodetector is responsive to the light emitted from the repetitively excited index stripes to generate an index signal in synchronism with the scanning of the electron beam having an index frequency as a function of the pitch of the index stripes and the horizontal scanning speed of the electron beam. Since the index stripes are in predetermined positional relationship with the triads of color phosphor stripes, the index signal may be used to control the switching of the color information at the appropriate times so as to modulate the beam with the red, green and blue information as the beam scans the R, G and B color phosphor stripes, respectively.

Since the index signal is generated in synchronism with the scanning of the electron beam, any non-uniformities in the scanning speed of of the beam introduce corresponding non-uniformities in the index frequency. These non-uniformities may arise from fluctuations in the transfer characteristics of the deflection yoke or other components used in the horizontal deflection circuit, from power source voltage fluctuations, from the influence of earth magnetism, or from other sources. If the horizontal deflection scanning speed of the beam is increased or decreased, the resulting change in the index frequency produces a phase shift in the times at which the red, green and blue information signals are switched to modulate the beam intensity. As a consequence of this disturbance in the timing of the color switching, color misregistration occurs. Thus, there is a definite need for apparatus to detect non-uniformities, in particular non-linearities, in the scanning speed of the electron beam and to compensate for such non-linearities in order to obtain proper color registration of the displayed video picture.

One method of reducing the deflection speed error is disclosed in U.S. Pat. No. 4,305,022, assigned in common with the present application, wherein compensation data for an entire frame of the video signal is stored in a memory and the deflection speed is compensated in accordance with the compensation data read out from the memory. This method, however, requires a very large memory for storing sufficient compensation data for an entire frame, and further requires complicated circuitry for writing in and reading out the compensation data to and from the memory. Furthermore, when the compensation data is preliminarily stored in a memory, there can be no compensation for real time changes taking place during the actual operation of compensation.

Another method has been proposed in U.S. Pat. No. 4,287,531, also assigned in common with the present application. In the apparatus disclosed in this patent, an oscillator generates an oscillating signal whose frequency is synchronized with the index signal, and a phase-locked loop, including a phase comparator for comparing the index signal to the oscillating signal so as to produce a control signal as a function of the difference therebetween, adjusts the frequency of the oscillating signal in accordance with this control signal. A switching arrangement is responsive to the oscillating signal to switch color information signals for modulating the beam. The apparatus also includes deflection control apparatus with a deflection device, such as an auxiliary yoke, for controlling the deflection of the beam, and a deflection signal generator which is responsive to the control signal produced by the phase-locked loop for supplying deflection control signals to the deflection device to vary the deflecting speed of the beam and thereby to maintain a substantially constant beam scanning speed. In this patented apparatus, as in the present invention, it is recognized that non-linearities in the horizontal deflection of the beam result in corresponding variations in the index frequency.

However, even with the improved deflection speed compensation provided by the apparatus of U.S. Pat. No. 4,287,531, perfect compensation for horizontal deflection linearity is impossible. This is because the compensation loop has an inherent delay time, which may be caused by inductance in the secondary deflection coil, in the low pass filter included in the phase-locked loop, or in other components. While this delay time is not large, it is yet not so small as to be negligible, nor can it be completely eliminated. This delay time causes a phase difference between the detected signal from the photodetector and the output signal from the secondary deflection coil, so that misregistration occurs.

Furthermore, when the scanning speed is linear, the control signal is a constant voltage, so that the deflection device may exhibit an oscillatory response, which is highly undesirable.

OBJECTS AND SUMMARY OF THE INVENTION

Therefore, it is an object of the present invention to provide improved deflection control apparatus for use in a beam index color television receiver.

It is another object of the present invention to provide a beam index color television receiver in which the linearity of the horizontal deflection scanning speed of the electron beam is improved.

It is yet another object of the present invention to provide a beam index color television receiver in which horizontal deflection scanning speed errors are compensated in real time in accordance with a generated index signal, thereby insuring the linearity of the horizontal deflection scanning speed irrespective of fluctuations in the transfer characteristics of the deflection circuitry.

It is another object of the present invention to provide a beam index color television receiver in which horizontal deflection scanning speed errors are compensated in real time to provide high quality image reproduction at all times.

It is still a further object of the present invention to provide a beam index color television receiver with real time compensation for horizontal deflection scanning speed errors and further with feedback control for suppressing any oscillatory response when the error signal is constant.

Therefore, in accordance with the present invention, deflection control apparatus is provided for a beam index color television receiver of the type including a cathode ray tube adapted to display a video picture in response to a received color television signal, the cathode ray tube having index stripes disposed to be scanned by a single electron beam of the cathode ray tube, detecting means for detecting when individual index stripes are scanned by the beam to produce an index signal having a frequency varying from a predetermined frequency when the scanning speed of the beam varies, phase-locked loop means including oscillating means for generating an oscillating signal whose frequency is synchronized with the index signal, and comparing means for comparing the index signal to the oscillating signal to produce an error signal as a function of the phase difference therebetween, and switching means responsive to the oscillating signal for switching color information signal used to modulate the beam. The deflection control apparatus comprises deflection control means for controlling the horizontal deflection of the beam and compensator means for delaying the error signal for a predetermined time, and providing a respective delayed error signal, the delayed error signal being supplied to the deflection means to cause the same to generate a control signal to correct the scanning speed of the beam so as to thereby maintain a substantially constant scanning speed thereof. In an important aspect of the invention, the predetermined time is such that the elapsed time from the detection of the scanning of one of the index stripes to the time of generation of the control signal in accordance therewith equals one horizontal line period.

By means of the apparatus according to the present invention, real time compensation information obtained from the index signal generated by the scanning of a first horizontal line may be applied to compensate for horizontal deflection speed errors in the next successive horizontal line, taking advantage of the high degree of vertical correlation between successive horizontal lines of a video signal. The elapsed time is made equal to one horizontal line period so that the compensation data may be applied to the corresponding points in the next line without having to be read into and out of memory. The inherent delay time, which is considerably smaller than one horizontal line period, is encompassed within the elapsed time so that it no longer produces a phase deviation. In addition, the compensating means may include feedback control to eliminate any oscillatory response to the error signal when the error signal is constant.

The above, and other objects, features and advantages of the invention will be apparent in the following detailed description of a preferred embodiment of the invention, which is to be read in connection with the accompanying drawings.

DETAILED DESCRIPTION OF THE PREFERRED EMBODIMENT

Figure 1:
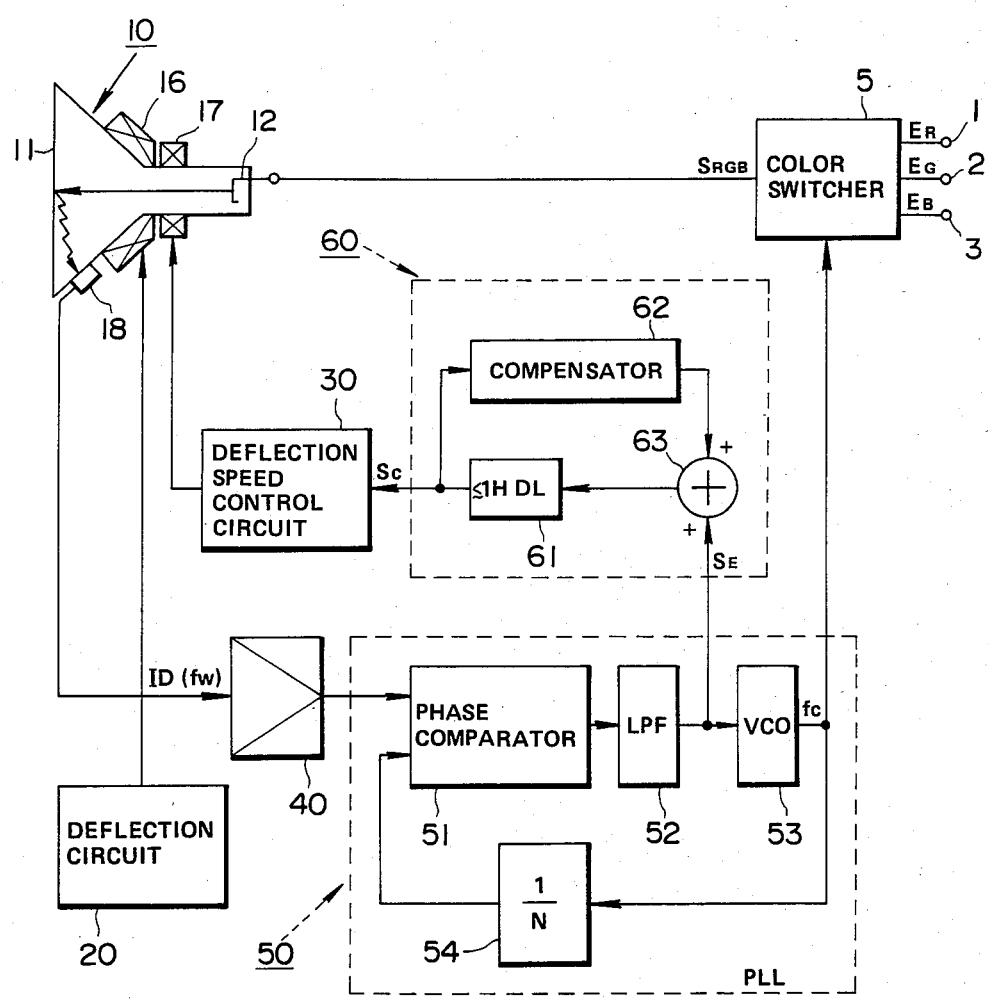
FIG. 1 is a block diagram illustrating a preferred embodiment of the beam index color television receiver according to the present invention.
Figure 2:
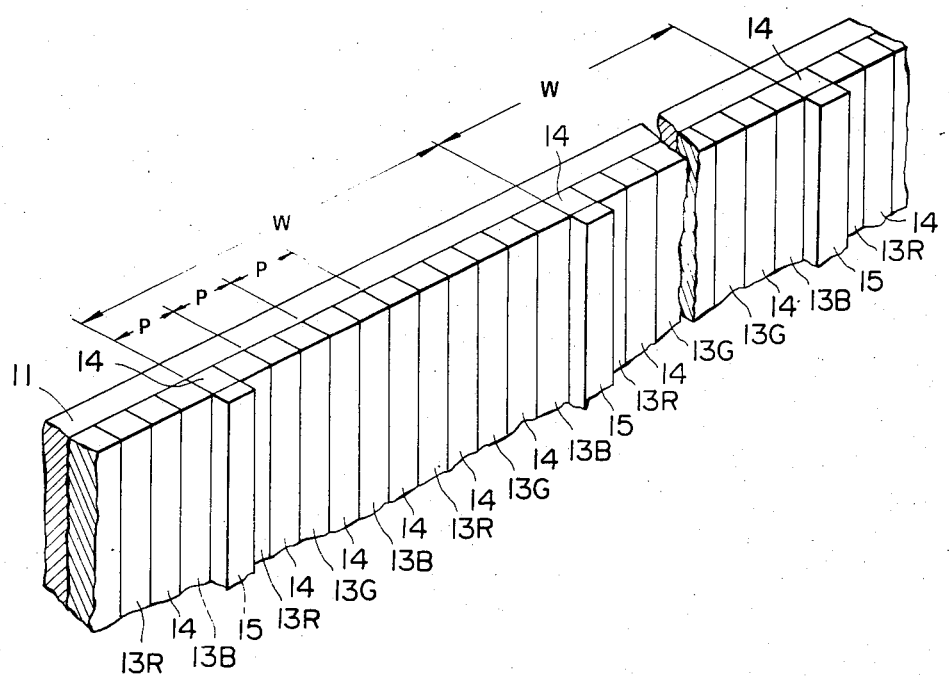
FIG. 2 is a fragmentary schematic perspective view of the screen of a cathode ray tube utilized in the beam index color television receiver according to the present invention.

Referring now to the drawings, and initially to FIGS. 1 and 2 thereof, there is illustrated a portion of a beam index color television receiver which incorporates a preferred embodiment of the present invention. The television receiver includes a beam index cathode ray tube (CRT) 10 formed of a glass envelope and containing an electron gun 12 for providing a single electron beam to scan a screen 11 of CRT 10. A main horizontal deflection yoke 16 is disposed around the path of the electron beam and is responsive to a main horizontal deflection drive signal from a main deflection circuit 20 to magnetically deflect the electron beam both horizontally and vertically. A secondary deflection yoke 17 is similarly disposed and provides a compensating magnetic field for compensating errors in the horizontal deflection speed of the electron beam caused by fluctuations in the operational characteristics of the main deflection yoke 16 and the horizontal deflection system as a whole.

Screen 11 of CRT 10 is illustrated in fragmentary form in FIG. 2. As illustrated therein, screen 11 has conventional color phosphor stripes 13R, 13G, 13B arranged in repetitive triads of red, green and blue (RGB) stripes disposed successively at a fixed pitch P in the horizontal direction of screen 11, which is also the horizontal scanning direction of the electron beam. Guard bands 14 are provided between adjacent color phosphor stripes 13R, 13G, and 13B, and consist of non-light emitting paint, for example, carbon black.

Index stripes 15 are also provided on screen 11 at a second predetermined pitch W equal to N times the pitch P of the color phosphor stripes 13R, 13G and 13B and in a predetermined positional relationship with the color phosphor triads. Index stripes 15 are formed of a fluorescent or phosphorous material, such that each one will emit a detectable signal when scanned by the electron beam. In the preferred embodiment illustrated in FIG. 2, each index stripe 15 is separated by two complete color phosphor triads, i.e. N=6, so that W=6P. In other embodiments, there might be one index stripe for each triad or for each three triads of color phosphor stripes, or even one index stripe for non-triplet multiples of color phosphor stripes. Whatever the specific positional relationship employed in the embodiment, the repetitive generation of the detectable signal as index stripes 15 are sequentially scanned will provide the necessary information for modulating the scanning electron beam with the appropriate color information.

Referring again to FIG. 1, CRT 10 further includes a photodetector 18 for detecting the detectable signals emitted by index stripes 15 as they are scanned by the electron beam. This detectable signal is indicated in schematic form in FIG. 1 by a broken arrow from screen 11 to photodetector 18. The output of photodetector 18 is a signal having a frequency corresponding to the frequency of emission of the detectable signal. This output is the beam index signal ID. When the electron beam scans across screen 11 at a constant speed, index signal ID will have a frequency $f_W$ inversely proportional to the pitch W of index stripes 15, i.e. 1/N times the frequency $f_P$ corresponding to the pitch P of the color phosphor stripes 13R, 13G and 13B. The index signal ID, after suitable processing to be described below, may be utilized in the beam index color television receiver according to the present invention to control the switching of color information signals to modulate the scanning electron beam.

Furthermore, index frequency $f_W$ is directly proportional to the scanning speed of the electron beam. Therefore, index signal ID may also be used to correct for non-linearities in the horizontal scanning speed. This correction, forming an important aspect of the present invention, will be described in detail below.

In the beam index color television receiver illustrated in FIG. 1, three primary color signals $E_R$, $E_G$ and $E_B$ are formed simultaneously from a received composite color television signal by a conventional video signal processor (not illustrated). The three color signals $E_R$, $E_G$ and $E_B$ are supplied to input terminals 1, 2, 3, respectively, of a color signal switching circuit 5. As described above, in a beam index color television of the point sequential scanning type, the single electron beam is sequentially modulated with the different color signals at different times so that the electron beam is modulated with, for example, the red color signal $E_R$ at times corresponding to the scanning of the red color phosphor stripes 13R. The color switcher 5 is operative, under the control of an oscillation control signal $F_c$ to generate a three primary color point sequential signal $S_{RGB}$ containing the information from the three color signals $E_R$, $E_G$, $E_B$, in appropriately time- multiplexed form. Signal $S_{RGB}$ is supplied to electron gun 12 of CRT 10 to control the modulation of the electron beam. An advantageous construction of such a color switcher 5 is illustrated in the commonly assigned U.S. Pat. No. 4,287,531, discussed above. As the construction of the color switcher 5 does not form a part of the present invention, further description will not be provided.

As stated above, the horizontal deflection of the electron beam is caused by magnetic fields generated by main deflection yoke 16 and secondary deflection yoke 17. Main deflection yoke 16 receives the main deflection control signal from deflection circuit 20 to deflect the electron beam horizontally to generate each successive line of the video signal. When there are variations in the operational characteristic of this deflection circuit 20, or in any of the other elements of the horizontal deflection system, or if there are fluctuations in the earth's magnetic field leading to real time non-linearities in the horizontal scanning speed of the electron beam, the non-linearities cause misregistration of the color image.

If the horizontal scanning speed of the electron beam is not constant, signal $S_{RGB}$ received from color switcher 5 will not provide the color modulation information at the correct time when the electron beam is in fact scanning a respective color phosphor stripe. This leads to misregistration of the color image and decreased image quality.

Therefore, signal $S_{RGB}$ is generated in response to the real time horizontal scanning speed and secondary deflection yoke 17 generates a compensating magnetic field to compensate for the non-linearities in the scanning speed of the electron beam. To this end, a deflection speed control compensation circuit is provided comprising amplifier 40, phase-locked loop 50 and deflection speed control circuit 30. The operation of phase-locked loop 50 in connection with the generation of signal $S_{RGB}$ has been described in detail in the commonly assigned U.S. Pat. No. 4,287,531. The purpose of phase-locked loop 50 is to provide the oscillation control signal $F_c$ to color switcher 5 so that signal $S_{RGB}$ will contain the appropriate color information signal $E_R$, $E_G$, or $E_B$, at the times corresponding to the actual scanning of red, green, or blue color phosphor stripes, respectively. In addition, phase-locked loop 50 provides an error signal $S_E$ to a compensator 60 and then through deflection speed control circuit 30 to secondary deflection yoke 17 to provide the compensating magnetic field to correct non-linearities of the horizontal scanning speed. The operation of compensator 60, which forms an important part of the present invention, will be described below following the description of phase-locked loop 50.

In the embodiment illustrated, pitch W of index stripes 15 is six times (two triads) pitch P of the color phosphor stripes, so that index frequency $f_W = 1/6\ f_P$. Since two triads of color phosphor stripes are disposed between each pair of index stripes 15, color switcher 5 should switch between terminals 1,2,3,1,2,3 during each period of index signal ID as the electron beam successively scans RGB RGB, so that the signal $S_{RGB}$ contains the correct color information. Oscillation control signal $F_c$ from phase-locked loop 50 to color switcher 5 should have a frequency $f_c = 6f_W = f_P$.

To this end, index signal ID is supplied from photodetector 18 to the input of amplifier 40. Amplifier 40 has a bandpass filter characteristic to select out the component with frequency $f_W$. An advantageous example of such an amplifier is described in U.S. Pat. No. 4,251,832, also commonly assigned with the present application. The output of amplifier 40 is supplied to an input of phase-locked loop 50. Phase-locked loop 50 is of conventional construction and includes a phase comparator 51 for comparing the phase of index signal ID to that of a frequency-divided oscillating signal produced by a voltage controlled oscillator (VCO) 53 and frequency-divided by a factor N by a divider 54. Any phase difference between the phase-compared signals produces an error signal which is supplied as a control signal via a low pass filter 52 to VCO 53 to adjust the frequency of the oscillating signal generated thereby. Thus, the output of VCO 53 is phase-synchronized with the index signal. In the illustrated embodiment, N=6, so that VCO 53 is designed to have a frequency $f_P = 6f_W$, and divider 54 divides by 6. Other pitch ratios could of course be provided, with a corresponding adjustment in the frequency division of divider 54.

If the deflection of the electron beam of CRT 10 is uniform, so that the horizontal scanning speed of the beam is linear, then the phase of index signal ID will be equal to the phase of the frequency-divided oscillating signal, so that phase comparator 51 detects no phase difference. However, if the horizontal scanning speed of the electron beam contains non-linearities, then the phase of index signal ID will vary in a corresponding manner, resulting in phase error signal produced by phase comparator 51. Phase-locked loop 50 functions to synchronize the phase of the oscillating signal generated by VCO 53 with the phase of the index signal, thereby to reduce the phase error signal to zero. Nevertheless, it will be appreciated that the output $S_E$ of low pass filter 52, which is derived from the phase error signal, represents the variation in the scanning speed of the electron beam. The index frequency $f_W$, which is a function of the actual, real time beam scanning speed, is thereby a function of the deflection current which flows in main deflection yoke 16. As is conventional, this deflection current is of a sawtooth waveform, whose slope represents the beam scanning speed. Changes in the slope of this deflection current cause changes in the scanning speed of the beam. The scanning speed is not exactly proportional to the deflection current because main deflection yoke 16 does not exhibit precise linearity. However, the index frequency $f_W$ is a very close approximation to the slope of the deflection current. Therefore, the output of low pass filter 52, i.e. error signal $S_E$, is an approximate representation of the first derivative of the deflection current. If the deflection current is of constant slope, that is, if the scanning speed of the beam is constant, its first derivative is zero, and it is appreciated that, if the scanning speed of the beam is constant, the signal produced by low pass filter 52 is a constant voltage.

VCO 53 is then locked in phase with index signal ID at a frequency $f_C=6f_W$. This frequency $f_C$ is equal, under linear conditions, to the frequency $f_P$ corresponding to the pitch P of the color phosphor stripes 13R, 13G and 13B on screen 11. Under non-linear conditions, the frequency $f_c$ reflects the actual times of scanning index stripes 15. Therefore, signal $S_{RGB}$ generated by color switcher 5 in response to the oscillation control signal $F_c$ maintains the correct correspondence between the actual time of scanning individual color phosphor stripes 13R, 13G, 13B and the switching of color information signals $E_R$, $E_G$, $E_B$, to permit the accurate reproduction of the color image.

The use of phase-locked loop 50 to provide the oscillation control signal at a frequency $F_c$ provides a highly advantageous control of color switcher 5. In addition, in the apparatus disclosed in the commonly assigned U.S. Pat. No. 4,287,531, the error signal from the low pass filter of the phase-locked loop is provided to a deflection speed control circuit for providing a control signal to a secondary deflection yoke to correct the non-linearities in scanning. In the apparatus disclosed in this commonly assigned patent, the deflection speed control circuit therein comprises an integrator for integrating the error signal to produce an integrated deflected control signal supplied to the secondary deflection yoke to vary the deflecting speed of the beam and thereby to maintain a substantially constant beam scanning speed. However, as was mentioned in the Background of the Invention, even with the advantageous apparatus disclosed in this commonly assigned patent, perfect compensation for the horizontal deflection scanning is impossible. This is because the entire compensation loop circuit as illustrated in FIG. 1 of the present application, from photodetector 18 through phase-locked loop 50, deflection speed control circuit 30 and secondary yoke 17, has an inherent delay time. This inherent delay time may be caused by inductance of the secondary deflection coil 17, in the low pass filter 52 or in any of the other circuit elements. This non-negligible delay time causes the transfer characteristic of the compensation circuit to have a phase lag between the detected signal from photodetector 18 and the output signal from secondary deflection coil 17. This slight phase difference in turn causes misregistration of the color video image.

Therefore, to eliminate the misregistration caused by this phase difference, the apparatus according to the present invention includes compensation circuit 60, as illustrated in FIG. 1. The operation of compensation circuit 60 is based upon the realization that successive lines of a video signal display a high degree of vertical correlation, so that vertically adjacent points in successive horizontal lines have highly similar characteristics. For this reason, it is believed that the non-linearities appearing in a first horizontal line will be closely similar to the non-linearities appearing in the next successive horizontal line from a point on the first line to the adjacent point immediately below.

Therefore, compensation circuit 60 in the apparatus according to the present invention is provided so that the entire delay time from the reception of the detectable signal by photodetector 18 to the generation of the output magnetic field from secondary deflection yoke 17 will be exactly one horizontal line duration (1H). The error signal $S_E$ from low pass filter 52, reflecting the real time non-linearities of the scanning speed of the electron beam during a first horizontal line, is delayed in compensation circuit 60 and then processed by deflection speed control circuit 30 so that the compensating magnetic field from secondary deflection yoke 17 is applied to correct the scanning speed at the vertically aligned points on the next successive horizontal line. The apparatus eliminates any phase deviation between the detected signal and the applied signal, thereby eliminating misregistration of the color video image.

Compensating circuit 60 comprises a delay circuit 61 having a delay time approximately equal to, but slightly less than, one horizontal line duration 1H, compensator 62 and adding means 63. Adding means 63 receives error signal $S_E$ from low pass filter 52 and adds it to a delayed, compensated error signal fed from adding means 63 through delay circuit 61 and back through compensator 62. The output of delay line 61 is fed as control signal $S_c$ to deflection speed control circuit 30, which advantageously may be constructed as the deflection control circuit disclosed in commonly assigned U.S. Pat. No. 4,287,531. Of course, it is contemplated that other deflection speed control circuits may be employed in the apparatus according to the present invention.

Figure 3:
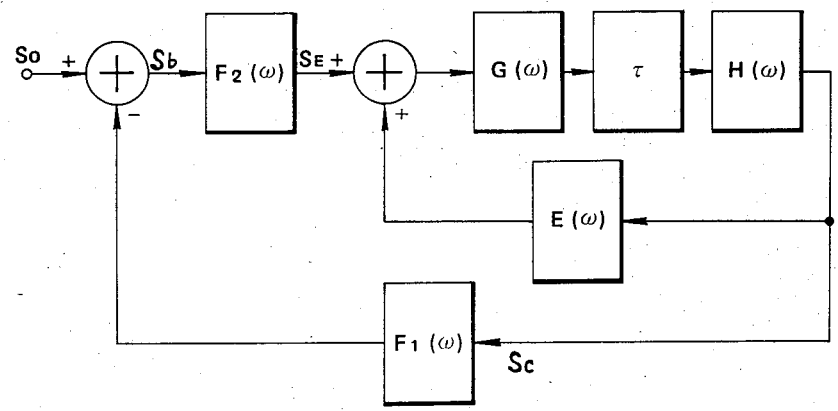
FIG. 3 is an equivalent circuit diagram of the horizontal deflection circuitry illustrated in block form in FIG. 1.
Figure 4:
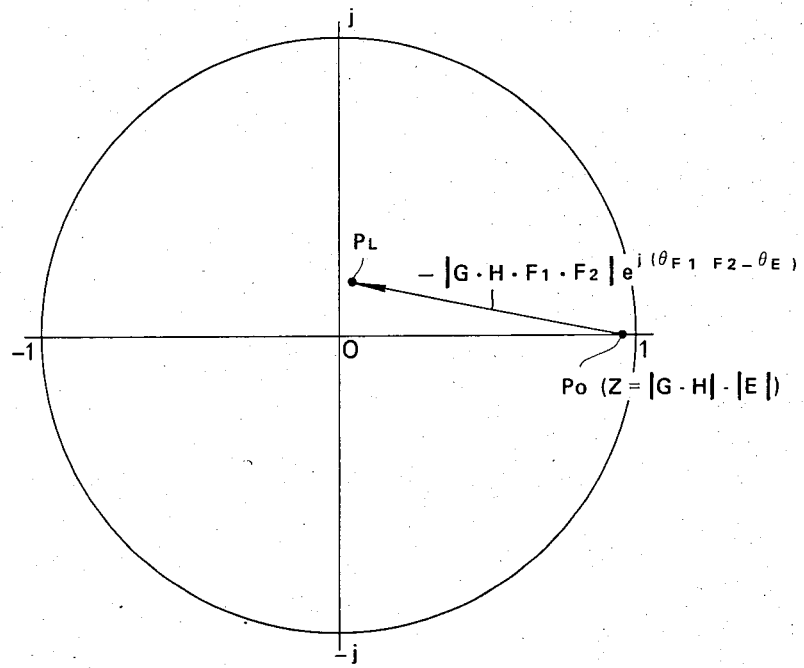
FIG. 4 is a plot of the transfer characteristic of the equivalent circuit of FIG. 3 on the complex z plane.

The manner in which compensation circuit 60 operates may be best understood by reference to FIGS. 3 and 4. FIG. 3 is a block diagram of an equivalent circuit of the entire deflection control circuit of the apparatus according to the present invention. $F_2(\omega)$ is the transfer characteristic of the circuit elements constituting photodetector 18, amplifier 40 and phase locked loop 50. $F_1(\omega)$ is the transfer characteristic of the circuit elements constituting deflection speed control circuit 30 and secondary deflection coil 17. $G(\omega)$ is the pre-filtering transfer characteristic of delay circuit 61, $H(\omega)$ is the post-filtering transfer characteristic of delay circuit 61, and $\tau$ represents the approximately 1H delay of delay circuit 61. Of course, the transfer characteristic of the pure delay is $e^{-j\omega\tau}$. $E(\omega)$ is the transfer characteristic of compensator 62, which is provided to match the transfer characteristics $F_1(\omega)$ and $F_2(\omega)$, so that the total delay may be made equal to exactly 1H.

Four signals are identified in FIG. 3. $S_o$ is a signal representing the linearity of the horizontal deflection control system in the absence of compensation, and $S_b$ is the restored signal with compensation. $S_E$ is the error signal from low pass filter 52 and $S_c$ is the control signal fed to deflection speed control circuit 30.

With the above described block diagram representing the equivalent circuit of FIG. 1, the transfer characteristic of the entire circuit may be seen to be:

$$\frac{S_b}{S_o} = \frac{e^{j\omega\tau} - G(\omega) \cdot H(\omega) \cdot E(\omega)}{e^{j\omega\tau} - G(\omega) \cdot H(\omega) \cdot E(\omega) + G(\omega) \cdot F_1(\omega) \cdot F_2(\omega) \cdot H(\omega)} \quad (1)$$

The following identities may be used:

$$G(\omega) \cdot H(\omega) = |G \cdot H| e^{j\theta_{GH}} \quad (2)$$

$$E(\omega) = |E| e^{j\theta_E} \quad (3)$$

$$F_1(\omega) \cdot F_2(\omega) = |F_1 \cdot F_2| e^{j\theta_{F_1F_2}} \quad (4)$$

When these identities are substituted into equation (1), equation (1) becomes:

$$\frac{S_b}{S_o} = \frac{e^{j(\omega\tau - \theta_{GH} - \theta_E)} - |G \cdot H| \cdot |E|}{e^{j(\omega\tau - \theta_{GH} - \theta_E)} - |G \cdot H| \cdot |E| + |G \cdot H| \cdot |F_1 \cdot F_2| e^{j(\theta_{F_1F_2} - \theta_E)}} \quad (5)$$

FIG. 4 is a plot illustrating the zero $P_0$ and pole $P_L$ on a complex plane where $z = e^{j(\omega\tau - \theta_{GH} - \theta_E)}$. The zero $P_0$ is at $z = |G \cdot H| \cdot |E|$, and the pole $P_L$ is at $$z = |G \cdot H| \cdot [|E| - |F_1 \cdot F_2| e^{j(\theta_{F_1F_2} - \theta_E)}]$$

Given the compensation circuit 60 as illustrated in FIG. 3, it is now possible to reliably compensate for non-linearities in the horizontal deflection speed of the electron beam by adjusting the transfer characteristic of compensator 62 to establish a total delay of exactly 1H. This novel and advantageous result is achieved in the preferred embodiment by setting the open loop gain of the path containing G(107), $H(\omega)$ and $E(\omega)$ at $\omega \approx 0$ as $$|G \cdot H| \cdot |E|_{\omega \approx 0} = 1 - \alpha \quad (6)$$

where $\alpha$ is a small quantity, made as close to zero as possible;

(B) setting the gain of the circuits $E(\omega)$ and $F_1(\omega)$, $F_2(\omega)$ at $\omega \approx 0$ as $$|E(\omega)|_{\omega \approx 0} = |F_1(\omega), F_2(\omega)|_{\omega \approx 0} - \beta \quad (7)$$

where $\beta$ is also as close to zero as possible;

(C) equating the phases of the circuits having the transfer characteristics $E(\omega)$ and $F_1(\omega)F_2(\omega)$, i.e.

$$\theta_E = \theta_{F_1F_2} \quad (8)$$

and (D) setting the delay time of the loop constituted by $G(\omega)$, $H(\omega)$, $E(\omega)$ and $\tau$ equal to one horizontal line period 1H.

By means of compensation circuit 60, the elapsed time from the detection of the scanning of a respective index stripe in a first horizontal line to the time of generation of the compensating magnetic field is made equal to exactly one horizontal line duration. The compensating magnetic field applies the compensation to the vertically aligned points on the next successive horizontal line without compensation data being read into or out of memory. Since the operational characteristics of the deflection control system and the signals at the vertically aligned points are highly correlated, this compensation accurately reflects the real time non-linearities of the beam scanning speed and eliminates color misregistration.

Compensation circuit 60 provides an additional advantage. When the compensation is perfect, error signal $S_E$ is a constant voltage, which may be zero volts. In that case, the next successive horizontal line, which may contain errors, is not compensated. Error signal $S_E$ is then no longer constant, so that the next line is compensated. When this occurs, only alternate lines are compensated. Compensator 62 provides a feedback loop to prevent this oscillatory behavior. By recirculating the error signal $S_E$ from the last compensated line, each line will be perfectly compensated. The addition of a constant $S_E$ will not affect the compensation.

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. Deflection control apparatus for a beam index color television receiver of the type including a cathode ray tube adapted to display a video picture in response to a received color television signal, said cathode ray tube having index stripes disposed to be scanned by a single electron beam of said cathode ray tube, detecting means for detecting when individual index stripes are scanned by said beam to produce an index signal having a frequency varying from a predetermined frequency when the scanning speed of said beam varies, phase-locked loop means including oscillating means for generating an oscillating signal whose frequency is synchronzied with said index signal and comparing means for comparing said index signal to said oscillating signal to produce an error signal as a function of the phase difference therebetween and to adjust the frequency of said oscillating signal in accordance with said error signal to have a predetermined relationship to the frequency of said index signal, and switching means responsive to said oscillating signal for switching color information signals which are used to modulate said beam, said deflection control apparatus comprising:

deflection control means for controlling the horizontal deflection of said beam; and compensator means for delaying said error signal for a predetermined time and providing a respective delayed error signal;

said delayed error signal being supplied to said deflection control means to cause the same to generate a control signal to correct the scanning speed of said beam so as to thereby maintain a substantially constant scanning speed thereof; and said predetermined time being such that the elapsed time from the detection of the scanning of one of said index stripes to the time of generation of said control signal in accordance therewith equals one horizontal line period.

2. Deflection control apparatus according to claim 1; wherein said compensator means includes adding means having first and second inputs and being supplied with said error signal at said first input thereof and producing a first output;

delay means for delaying said first output by a period less than one horizontal line period and producing a delayed output signal as said delayed error signal; and feedback compensation means receiving said delayed error signal for producing a second output fed to said second input of said adding means, such that said first output is the sum of said second output and said error signal.

3. Deflection control apparatus according to claim 2; wherein said feedback compensation means, said adding means and said delay means have transfer characteristics selected with respect to each other to eliminate any oscillatory response of said deflection control means to said error signal when said error signal is constant.

4. Deflection control apparatus according to claim 2; wherein said feedback compensation means, said adding means, said delay means, said detecting means, said phase-locked loop means of said deflection control means have transfer characteristics selected with respect to each other for causing said elapsed time to equal one horizontal line period.

* * * * *